May 6, 1947.  F. R. HIGLEY  2,420,078
THERMALLY RESPONSIVE DEVICE
Filed March 27, 1943   2 Sheets-Sheet 1

INVENTOR.
FRANK R. HIGLEY
BY
Kurs Hudson & Kent
ATTORNEYS.

May 6, 1947.  F. R. HIGLEY  2,420,078
THERMALLY RESPONSIVE DEVICE
Filed March 27, 1943  2 Sheets-Sheet 2

INVENTOR.
FRANK R. HIGLEY
BY
Kwis Hudson & Kent
ATTORNEYS

Patented May 6, 1947

2,420,078

UNITED STATES PATENT OFFICE 2,420,078

THERMALLY RESPONSIVE DEVICE

Frank R. Higley, Cleveland Heights, Ohio, assignor to The Bryant Heater Company, Cleveland, Ohio, a corporation of Ohio Application March 27, 1943, Serial No. 480,829

8 Claims. (Cl. 158—117.1)

This invention relates to improvements in thermally responsive devices, including an improved thermally responsive unit employed in the device.

One of the objects of the invention is the provision of a thermally responsive device which shall function rapidly and shall have an unusually long stroke while retaining the strength necessary for the operation of heating controls or the like, these advantages being obtained partially by the cascading of thermally responsive units, but more particularly by the employment of a unit having certain novel characteristics.

Another object is the provision of a thermally responsive unit of the type in which a pair of leg elements are employed, which unit shall be rigid longitudinally and the joints of which shall be rigid lengthwise of the unit but flexible crosswise.

A further object is the provision of a unit of this character which shall be compact, shall require a minimum quantity of expensive metal, and one which may be easily assembled and producible in quantity in such manner as to have uniformity in operation.

Still another object is the provision of a pilot assembly embodying a thermally responsive device which shall be adaptable for use in vertical, horizontal or intermediate positions.

Other objects and features of novelty will appear as I proceed with the description of those embodiments of the invention which, for the purposes of the present application, I have illustrated in the accompanying drawings, in which Fig. 1 is an elevational view, partly in section, of a thermally responsive device embodying the invention;

Figure 13:
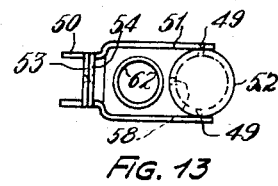
Figure 7:
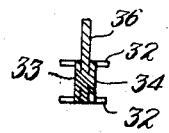
Figure 8:
Figure 9:
Figure 10:
Figure 11:
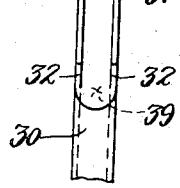
Figure 12:
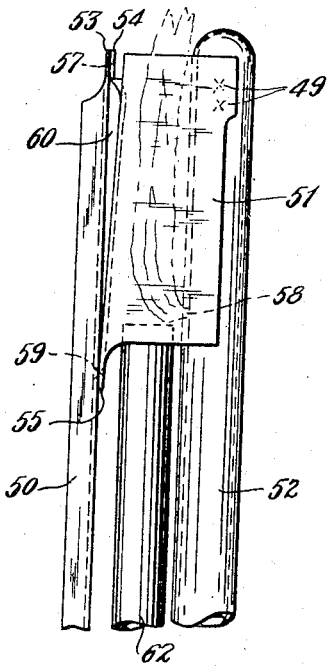
Figure 6:
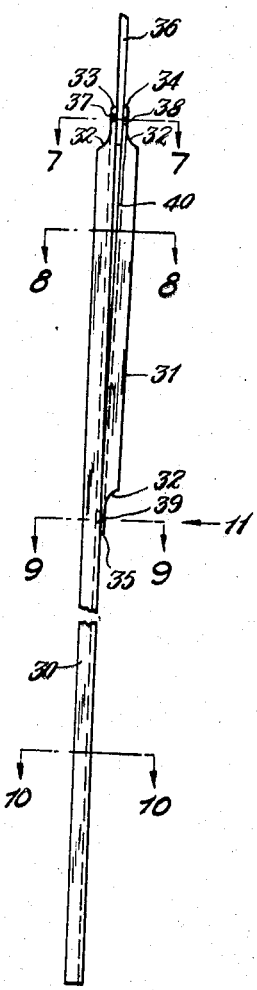
Fig. 6 is a plan or elevational view, depending upon circumstances, of a thermally responsive unit built in accordance with the invention.

Figs. 7, 8, 9 and 10 are detail sectional views of the same taken substantially on the lines 7—7, 8—8, 9—9 and 10—10 of Fig. 6;

Fig. 11 is a fragmental elevational view looking in the direction of arrow 11, Fig. 6;

Fig. 12 is a fragmental elevational view of a modified form of thermally responsive device; and Fig. 13 is a plan view of the same.

Figure 2:
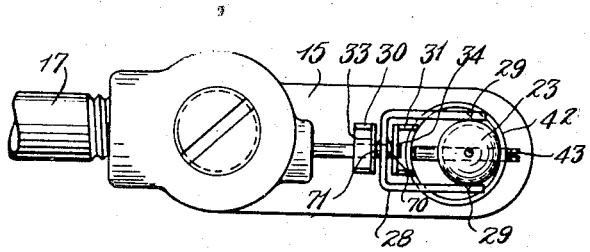
Fig. 2 is a plan view of the same.
Figure 3:
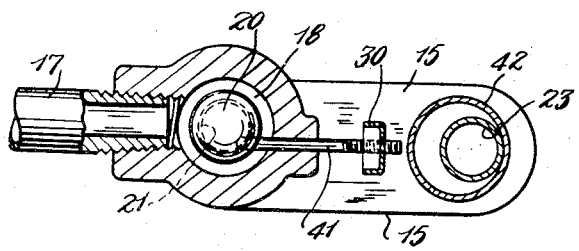
Fig. 3 is a cross-sectional view taken substantially on the line 3—3 of Fig. 1.
Figure 1:
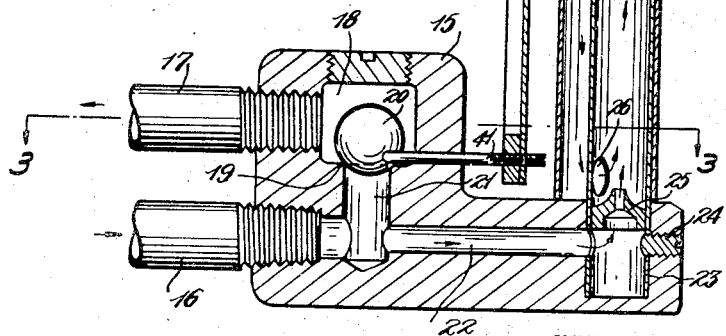

In Figs. 1, 2 and 3 I have illustrated a pilot assembly, including a thermally responsive device in which is embodied a novel thermally responsive unit. In addition to this novel unit the illustrated device comprises also a second thermally responsive unit arranged alongside the first one, the two units being attached together and being arranged to be heated by a common flame so that their deflections will be additive, and the first unit being preferably tubular and functioning also as a pilot burner.

As illustrated herein, the device comprises a casting 15 to which are connected fuel gas conductors 16 and 17, the conductor 16 coming from the gas supply and the conductor 17 leading to the burner whose operation is to be controlled. In the casting there is a valve chamber 18 having in its lower surface a circular valve seat 19 upon which is adapted to rest a ball valve 20 which controls the flow of gas from conductor 16 to conductor 17 by way of cross-passage 21. A drilled passage 22 of smaller bore carries gas to the lower end of a pilot tube 23 which is set into a socket in the casting and is thus anchored at that end. It may be held against possible movement in any direction by a set-screw 24. A spud 25 fills the bore of the tube above the level of passage 22 and serves to project a fine stream of gas upwardly at the axis of the tube, thereby entraining air which enters through one or more ports 26 from an air conducting pipe later to be described.

Near the upper end of pilot tube 23 I form a series of vertically spaced small bore apertures or ports 27 from which issue the small flames which serve to heat the thermally responsive units in the manner which will be presently described. The upper end of the pilot tube may have a port therein as shown, and from this port a relatively large flame may be played upon the burner to be ignited.

The upper end of pilot tube 23 is straddled by the legs of a U-shaped bracket 28, the bracket being secured to the tube by a plurality of spot-welds, indicated at 29, through each leg. As will appear, the pilot tube itself acts as a thermally responsive unit, from which this bracket 28 constitutes a connection with and support for a second thermally responsive unit which will now be described.

30 is a long leg of channel form attached at its upper end to the bracket 28 and disposed to extend downwardly alongside the pilot tube 23 with a small space therebetween. 31 is a short leg also of channel form. The upper ends of both of these legs and the lower end of the short leg have their flanges reduced as at 32 to gradually diminish their height leaving only flat web portions which form protruding end tabs 33, 34 and 35. These tabs are rigid as against force applied lengthwise of the legs but are flexible crosswise, that is to say, they flex readily when subjected to force tending to bend them transversely of their legs.

It is to be noted that the reduction of the flanges at the ends of their legs is not only gradual, but effectively with curvature having tangency to the resultant flat end tabs. This is important, as it avoids localization of flexure without impairing flexibility.

For mounting of the legs 30, 31 the cross-piece or base of the U-shaped bracket 28 has therein two small oppositely directed projections 70, 71 struck up from the metal thereof, and a similar projection 72, struck up from the web portion of leg 31. Welds are effected at these projections 70, 71 and 72. Consequently the tabs 33 and 34 touch the support 36' at the projections 70, 71 only, and the tab 35 touches the leg 30 at the projection 72 only. Transfer of heat between the legs is therefore substantially confined to the paths through said small projections in the bracket.

The thermally responsive operation of the device will be as follows: In Fig. 1 there appear essentially three units each individually responsive to operation of the pilot flame 27, all acting with cumulative or additive effect to move the lower end of the member 30 relative to the lower end of the pilot tube 23 in the following manner: Referring to Fig. 1 and assuming the pilot flame just lit after a period of non-operation, it will be apparent that ignition of the pilot flame heats the right hand leg member 31, the bracket 28, and the left side of the pilot tube 23.

The leg members 30 and 31 together form a pair of leg elements which cooperatively comprise a thermally responsive unit. When the shorter element 31 is heated relative to the longer element 30, the former extends under thermal expansion, substantially without flexure intermediate its length because of its flanges, but flexes at its end tabs causing deflection or swinging of the lower end of the element 30 to the left relative to the bracket 28, this movement of the element 30 being accompanied by flexure at its upper end tab 33. The characteristic of the motion of the unit as a whole is a lateral flexing or deflection of its lower or free end relative to its upper or base end although actually because of its flanges the element 30 swings rather than flexes.

The bracket 28 itself receiving heat from the pilot flame has thermal expansion transversely of tube 23 in Fig. 1 to move its base part 36 from the upper end of the pilot tube 23. This causes transitory motion of the element 30 from the pilot tube 23 so that its lower end moves further to the left than would otherwise be the case.

The left hand side of the tube 23 being heated by the pilot flame more than the right side, thermal expansion of the left side relative to the right side effects curvature or flexure of the upper end of the pilot tube toward the right, with consequent clockwise angularity of its upper end relative to its fixed lower end. Such angularity is imparted to the leg element 30, by the bracket 28, so that the lower extremity of the element 30 moves still further to the left, Fig. 1.

Thus, the total motion of the leg member 30 to the left responsive to the flame 27 represents the sum of the effect of the extension of its cooperative leg 31, thermal expansion of the bracket 28, and flexure of the pilot tube 23.

It will be apparent that upon extinguishment of the pilot flame 27 the reverse effect is had upon each of the described three contributing functional arrangements, so that the lower end of the leg element 30 returns to its initial cold position.

It is notable that the pilot tube 23 and the cooperative pair of leg elements 30 and 31 comprise two units both thermally responsive to a common source of heat located between them, are both of elongated form and both have motion responsive to the heat source, the motion of the two being so related that their total motion represents the sum of their individual motions. This follows from the fact that the base of one of the units—that having the leg elements 30, 31—is fixed in relation to the free or moving end of the other unit—the pilot tube 23—and consequently remote from the base of the latter which is its lower end, Fig. 1.

Referring now to Figs. 6 to 11 inclusive, the two legs 30 and 31 are arranged back to back and their upper ends are spaced apart, preferably by an interposed mounting support 36. The tabs 33 and 34, disposed upon opposite sides of the support 36, are joined to the latter rigidly by spot-welds 37 and 38 which may be simultaneously made. The tab 35 is attached to the web of leg 30 by a further spot-weld 39. The construction is thus generally similar to that in Fig. 1 except that the welding projections are omitted.

Figures 4, 5:
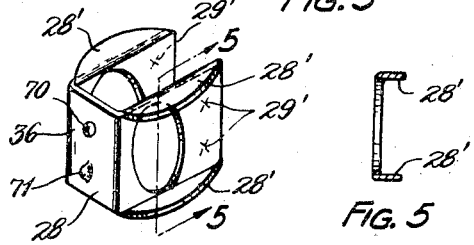
Fig. 4 is a perspective view of the bracket appearing in Figs. 1 and 2.
Fig. 5 is a section in the plane indicated by line 5—5 of Fig. 4.

Figs. 4 and 5 illustrate a slightly modified form of U-shaped bracket 28, wherein the side elements of the bracket are provided with reenforcing flanges 28'. In other respects the bracket is substantially like that of Figs. 1 and 2.

In the illustrated case, the thermally responsive device is employed for valve actuation, and for the purpose a pin or rod 41 is adjustably threaded in the lower end of leg 30, the pin being slidable through an opening in the casting 15 and its free end being arranged to engage ball valve 20 for pushing the latter off its seat when leg 30 swings toward the left in Fig. 1.

Surrounding the pilot tube 23 between the casting 15 and the ports 27 there is an air intake pipe 42, the axis of which is offset from the axis of tube 23 in the direction toward the element 30, 31. One means of bringing the pipe to this eccentric position and maintaining it there is illustrated in Fig. 1, where a pin 43 extends through an opening 44 in the pipe and an opening 45 in the tube and is threaded in the wall of the tube opposite opening 45, its inner end being adapted to engage the inner wall of the pipe opposite the opening 44. When this pin is threaded inwardly as far as it will go, it pushes the pipe 42 to the left into engagement with the tube on the right-hand side of the latter as viewed in this figure, and holds the parts in that relation. Air which has passed through the flame between the tube and the element 30, 31 enters the eccentric space at the top of pipe 42 and flows down between the pipe and the tube to pass through ports 26 into the pilot tube. By this means any particles of lint or dust in the air are incinerated and clogging of the small gas ports is thereby avoided.

In the form of the invention illustrated in Figs. 12 and 13 there is a pilot tube 52 similar to pilot tube 23. Tube 52, however, instead of having a series of small ports spaced lengthwise of the tube, has a single somewhat larger port 58 from which a long flame may be discharged to extend upwardly along the tube and beyond its upper extremity, the end of the tube being closed. The member 51, like the part 28, may be termed a bracket although in addition to its function for that purpose it serves also as one leg of a thermally responsive element, in other words, it corresponds in the latter respect with the leg 31 of Fig. 1. It has a U-shaped cross-section and straddles tube 52, being securely welded thereto at 49. Its vertical dimension is approximately the same as that of leg 31, and hence it encloses the space around the pilot flame except at the bottom and top of the latter, and thereby shields the flame against cross-drafts in any direction. Furthermore, the space within the well formed by member 51 and tube 52 is relatively insensitive to radiant heat. An air intake pipe 62 similar in function to pipe 42 extends upwardly into the well above mentioned, the air which enters this pipe being incinerated by the pilot flame. The web part of member 51 has a tab 54 struck out from its upper end and to this tab there is secured by a weld 57 a tab 53 at the upper end of a long leg 50 which may be substantially identical with leg 30 of the first described form of the invention. At the lower end of member 51 there is a tab 55 which is secured to the web of leg 50 by a weld 59. The legs 50 and 51 are therefore mounted back to back with a space 60 between them. In this form of the invention the pilot flame is effective to heat one side of the pilot tube 52 and to heat three sides of the member 51. The expansion of one side of the pilot tube tends to tilt the member 51 clockwise and the expansion of that member tends to swing the leg 52 clockwise about the connection between the tabs 53 and 54. Hence the deflection of the two units is additive.

The thermal unit 30, 31 or 50, 51, as the case may be, and more particularly the hot leg 31 or 51, is constructed of an alloy having high resistance to corrosion and high thermal expansion with thermal conductivity as low as other considerations will permit. Each of the legs, because of its form, is highly rigid between its ends and highly flexible at the joints, which constitutes an important feature of the invention. The welds between legs provide joints which permit no lost motion such as would result from looseness in pivotal joints, while the flexible tabs permit bending at the joints without friction such as would result from tight pivot joints. The channel flanges of course contribute to the strength of the unit, but they have the additional advantage of confining the flame on the heated side so as to make it most effective, while on the cool side they assist in radiating heat.

The pilot tube 23 or 52, as the case may be, is also constructed of material having high corrosion resistance and high thermal expansion since it constitutes one of two thermally responsive units going to make up a double-acting thermally responsive device. A pilot tube of such general character is disclosed in Patent No. 2,363,525 granted to me November 28, 1944. The support of the two legged thermal element from the free end of this tubular element, and the heating of both by the same heat source located to be effective between them so as to make their deflection cumulative or additive is, however, a part of the present invention.

It may be noted that the brackets 28 and 51, being exposed to the heat of the pilot flames, necessarily expand and in so doing tend to separate the upper ends of the tubular and two-legged units. Accordingly the bracket in each of these cases constitutes a third thermally responsive unit, the effect of which is added to the deflections of the other two. However, the expansion of the bracket makes a contribution to the final result which is small in comparison to the flexure of the tubular and two-legged units, particularly the latter.

While I have described the unit of Fig. 6 as a compensated unit and in Fig. 1 have shown an application of a similar unit for that purpose, it should be understood that the two legs may be constructed of metals or alloys having different coefficients of expansion, in other words, it may be built as a bi-metal unit.

Figs. 1 and 12 illustrate pilot assemblies in which the pilot is mounted vertically, but slight modifications, particularly in the disposition of the gas ports, would permit a horizontal or inclined position, as will be apparent to those skilled in the art.

I claim:

1. In a thermally responsive device, two thermally responsive units of the laterally deflecting type arranged alongside each other, one of said units being metallic and tubular and being anchored at one end, the other unit being attached to and supported by the free end of said tubular unit, and means for introducing a combustible mixture into said tubular unit, said tubular unit having side port means adapted to introduce flame into the space between said units.

2. In a device of the character described, a thin walled metallic pilot tube, a thermally responsive unit of the laterally deflecting type disposed alongside said pilot tube having one end attached to and supported upon the free end of the pilot tube, said pilot tube having side port means therein disposed to introduce flame into the space between itself and said unit to laterally deflect both and thereby cause additive motion of the pilot tube and unit.

3. In a device of the character described, a thermally responsive pilot tube, a thermally responsive unit disposed alongside said pilot tube having one end attached to and supported upon the free end of the pilot tube, said pilot tube having port means therein disposed to introduce flame into the space between itself and said unit, and an intake pipe for primary air disposed to take air from the space between said tube and said unit and to conduct it along the pilot tube and into the latter.

4. In apparatus of the character described, a thermally responsive pilot tube, a thermally responsive unit disposed alongside said pilot tube having one end attached to and supported upon the free end of the pilot tube, said pilot tube having port means therein disposed to introduce flame into the space between itself and said unit, and an intake pipe for primary air eccentrically surrounding said pilot tube adjacent said port means with its axis offset from the tube axis in the direction toward said unit, said pipe being disposed to take air from the space between said tube and said unit, and said tube having an air intake port communicating with the interior of said pipe.

5. In apparatus of the character described, a gas pilot tube anchored at one end, a thermally responsive unit of the type in which temperature changes cause sidewise motion, said unit being arranged alongside said pilot tube, and a U-shaped bracket rigidly connecting said unit with the free end of said pilot tube and enclosing a space between the unit and tube, said tube having port means arranged to introduce flame into said space, whereby the bracket constitutes a flame shield.

6. In a thermally responsive device, a gas pilot tube anchored at one end, a thermally responsive unit comprising one long leg and one short leg, the short leg having one end flexibly connected with the long leg at one end of the latter and the other end of the short leg being flexibly connected with the long leg at an intermediate point of the latter, said short leg having side flanges embracing the pilot tube and welded to the free end of said tube, whereby said short leg serves as the means for mounting said unit on the pilot tube, said pilot tube having port means therein adapted to play flame upon said short leg.

7. In apparatus of the character stated, a gas pilot tube anchored at one end, a U-shaped sheet metal bracket the sides of which embrace said tube and are secured thereto, a thermally responsive unit comprising a pair of legs spaced apart by the cross member of the bracket and secured thereto, said legs extending alongside said tube and being connected together at a point remote from said bracket, said tube having port means therein opposite said thermally responsive unit.

8. In apparatus of the character stated, a gas pilot tube anchored at one end, a U-shaped sheet metal bracket the sides of which embrace said tube and are secured thereto, a thermally responsive unit comprising a pair of legs spaced apart by the cross member of the bracket and secured thereto, said legs extending alongside said tube and being interconnected at a point remote from said bracket, said tube having port means therein facing said thermally responsive unit.

FRANK R. HIGLEY.

REFERENCES CITED

The following references are of record in the file of this patent:

UNITED STATES PATENTS

| Number | Name | Date |
|---|---|---|
| 817,707 | Hansen | Apr. 10, 1906 |
| 857,298 | Nix | June 18, 1907 |
| 1,116,534 | Baker | Nov. 10, 1914 |
| 2,267,164 | Newton | Dec. 23, 1941 |
| 2,164,887 | Roberts et al. | July 4, 1939 |
| 2,000,294 | Newell | May 7, 1935 |
| 2,017,725 | Newell | Oct. 15, 1935 |
| 1,971,882 | Tuck | Aug. 28, 1934 |
| 2,185,436 | Gordon | Jan. 2, 1940 |
| 2,130,175 | Betz et al. | Sept. 13, 1938 |
| 2,192,629 | Beam | Mar. 5, 1940 |
| 666,792 | Beese | Jan. 29, 1901 |
| 1,842,336 | TePas | Jan. 19, 1932 |
| 2,204,791 | Davis | June 18, 1940 |
| 1,966,735 | Sackett | July 17, 1934 |
| 2,260,737 | Bergtholdt, Jr. | Oct. 28, 1941 |
| 2,185,436 | Gordon, Jr. | Jan. 2, 1940 |
| 693,352 | Glou et al. | Feb. 11, 1902 |
| 2,291,805 | Denison | Aug. 4, 1942 |
| 1,963,957 | Cunningham | June 26, 1934 |
| 2,222,113 | Morrow | Nov. 19, 1940 |
| 1,290,866 | Arias | Jan. 14, 1919 |
| 2,290,963 | Higley | July 28, 1942 |
| 2,064,909 | Hahn | Dec. 22, 1936 |
| 1,835,993 | Stark | Dec. 8, 1931 |
| 2,192,629 | Beam | Mar. 5, 1940 |

FOREIGN PATENTS

| Number | Country | Date |
|---|---|---|
| 25,058 | Norse | Oct. 5, 1914 |
| 309,463 | German | Nov. 25, 1918 |